United States Patent [19]

Jones

[11] 4,300,215

[45] Nov. 10, 1981

[54] WIDE ANGLE ACOUSTIC CAMERA

[75] Inventor: Charles H. Jones, Pasadena, Md.

[73] Assignee: Westinghouse Electric Corp., Pittsburgh, Pa.

[21] Appl. No.: 156,959

[22] Filed: Jun. 6, 1980

[51] Int. Cl.³ .............................................. G01S 15/89
[52] U.S. Cl. ....................................... 367/11; 367/88; 367/150
[58] Field of Search ....................... 367/7, 11, 88, 150; 310/335, 337

[56] References Cited

U.S. PATENT DOCUMENTS

| | | | |
|---|---|---|---|
| 3,742,436 | 6/1973 | Jones | 367/88 X |
| 3,818,425 | 6/1974 | Peynaud et al. | 367/12 |
| 3,898,608 | 8/1975 | Jones et al. | 367/88 X |
| 4,025,805 | 5/1977 | Coltman et al. | 367/150 |
| 4,060,791 | 11/1977 | Jones et al. | 367/7 |

Primary Examiner—Richard A. Farley
Attorney, Agent, or Firm—D. Schron

[57] ABSTRACT

A conical acoustic lens in conjunction with a ring of transducer elements located on a circle disposed above the lens is utilized to form a plurality of radial beams for imaging a target area beneath the apparatus. The transducers may occupy the fully 360° of the circle or a sector less than 360° in which the case the apparatus may be rotated to give full 360° coverage.

20 Claims, 27 Drawing Figures

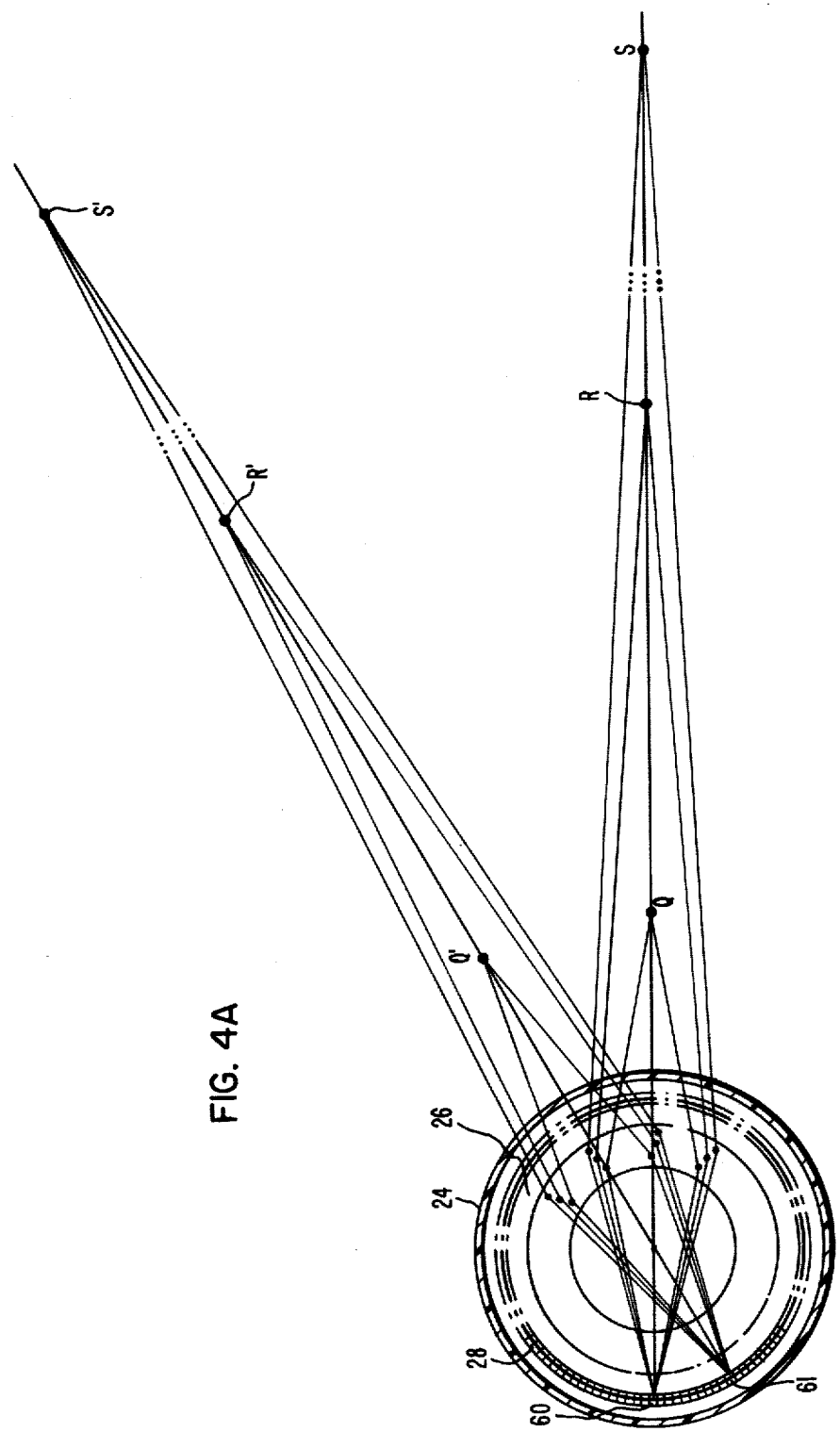

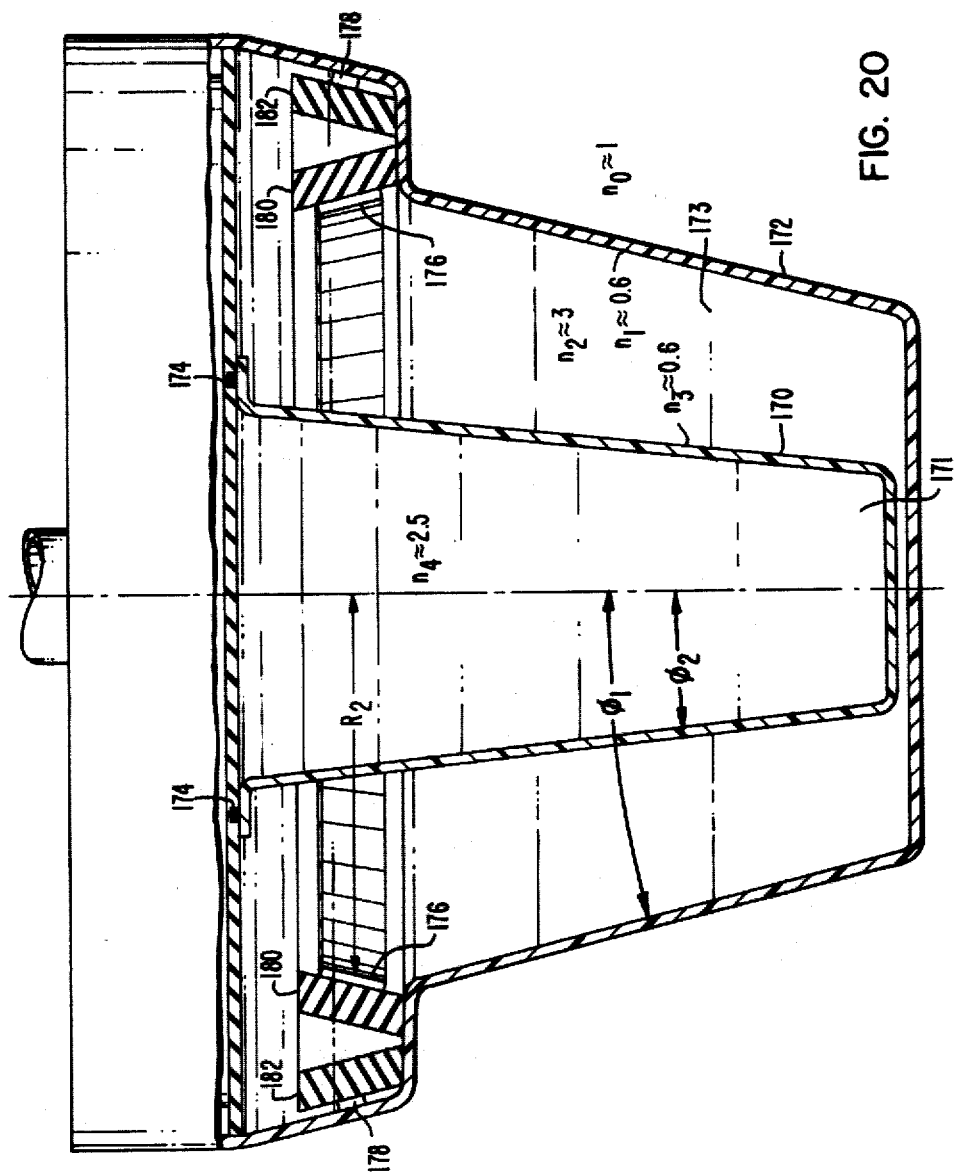

WIDE ANGLE ACOUSTIC CAMERA

BACKGROUND OF THE INVENTION

1. Field of the Invention:

This invention relates to acoustic imaging systems for obtaining an acoustic picture of an underwater target area of interest.

2. Description of the Prior Art:

A variety of underwater acoustic cameras exist utilizing the principles of sidelooking sonar to image a target area laterally of the camera apparatus.

A transmitted pulse of acoustic energy is utilized to sonify the target area, the returns from which are received by multiple receiver beams as the pulse propagates from a minimum range out to a maximum range of interest. A display device then portrays these returns so as to display the area under investigation and any targets on it. The multiple beams may be formed electronically such as, for example, described in U.S. Pat. No. 3,742,436 or may be formed utilizing a plurality of individual transducers in conjunction with a lens system as in U.S. Pat. No. 3,898,608.

For various military missions, it would be desired to image a relatively wide area, for example 360° below the apparatus. U.S. Pat. No. 3,742,436 includes such a system utilizing a single rotating beam, however this method is too slow to be practical where the apparatus is to be towed at a moderate rate of speed.

Some imaging systems utilize a spherical acoustic lens in conjunction with a plurality of transducer elements, however such lens is not well suited because it produces focusing in elevation as well as azimuth. For high resolution work, a vertical beam angle of 30° to 60° and focusing in azimuth only, is desirable.

SUMMARY OF THE INVENTION

An underwater acoustic camera for imaging a target area from a mininum range out to a maximum range in accordance with the present invention includes a housing structure including a generally conical acoustic lens portion having an axis oriented vertically during use over the target area. The camera includes a plurality of active transducer elements arranged on the circumference of a circle which lies inside of the housing structure in a plane perpendicular to the lens axis with the center of the circle lying on the axis. The transducer elements are relatively small and may occupy a full 360° around the axis or a portion thereof.

The lens is shaped so as to focus acoustic returns from relatively narrow radial areas on the target area onto respective transducer elements to cause corresponding output signals from the elements. These signals are then processed and displayed. In embodiments where the transducer elements do not extend all the way around the lens axis, provision may be made for rotating the apparatus so as to image a 360° area.

BRIEF DESCRIPTION OF THE DRAWINGS

FIG. 4A is a plan view along line IV—IV of FIG. 3A that includes some acoustic rays to illustrate the focusing action of the lens;

FIG. 20 is a cross-sectional view of an embodiment of the invention which employs two concentric liquid filled conical shaped shells each of which is filled with a different lens liquid.

DESCRIPTION OF THE PREFERRED EMBODIMENTS

Figure 1:
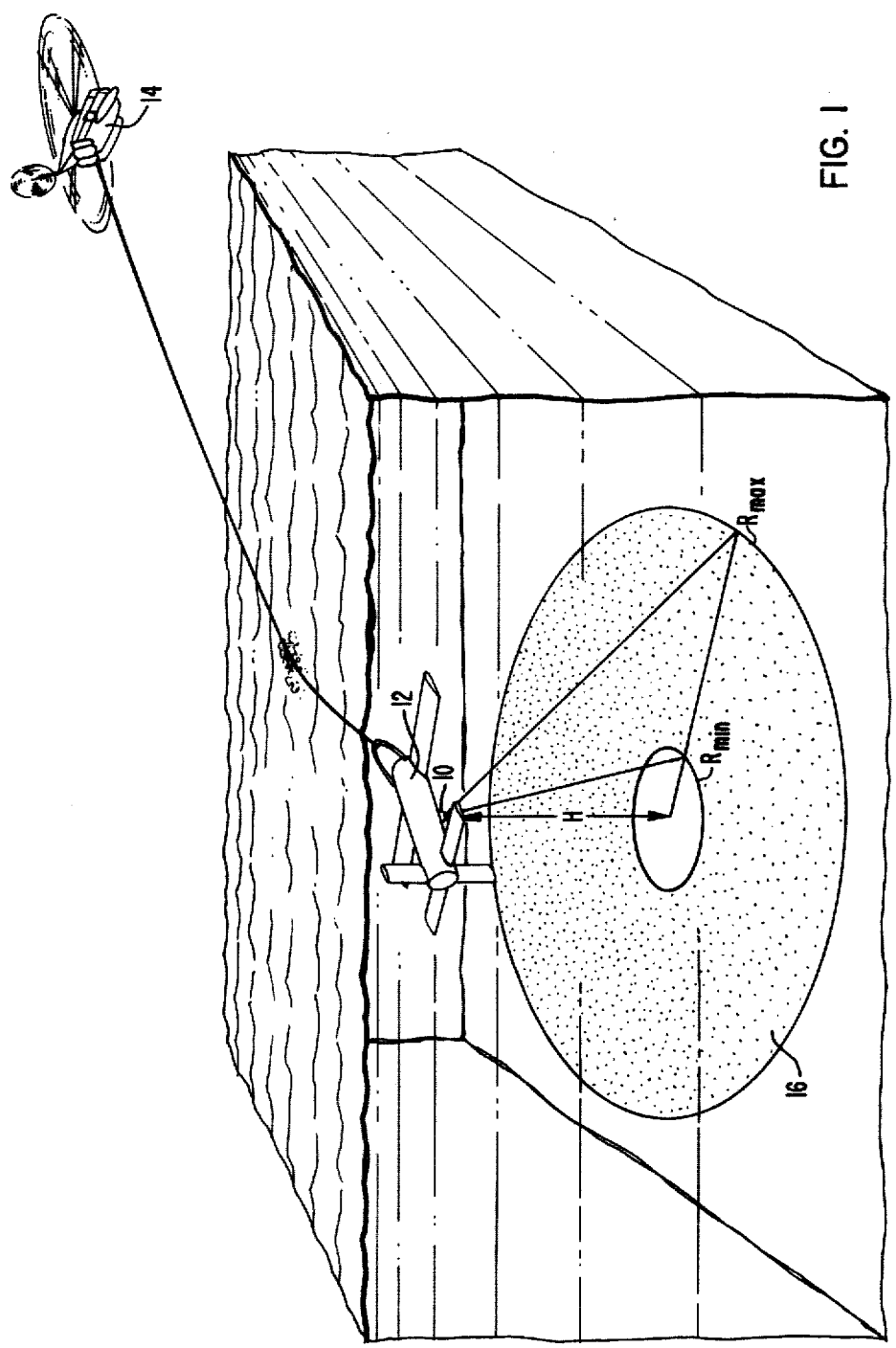
FIGS. 1 and 2 are views of the apparatus operating over a target area and further illustrating two different types of carriers.

In FIG. 1, the acoustic camera apparatus 10 is mounted on a carrier vehicle 12 illustrated as being towed by a helicopter 14. The apparatus is disposed at an altitude H above a target area 16 of which an acoustic image is to be displayed from some minimum range $R_{min}$ to a maximum range $R_{max}$.

Figure 2:
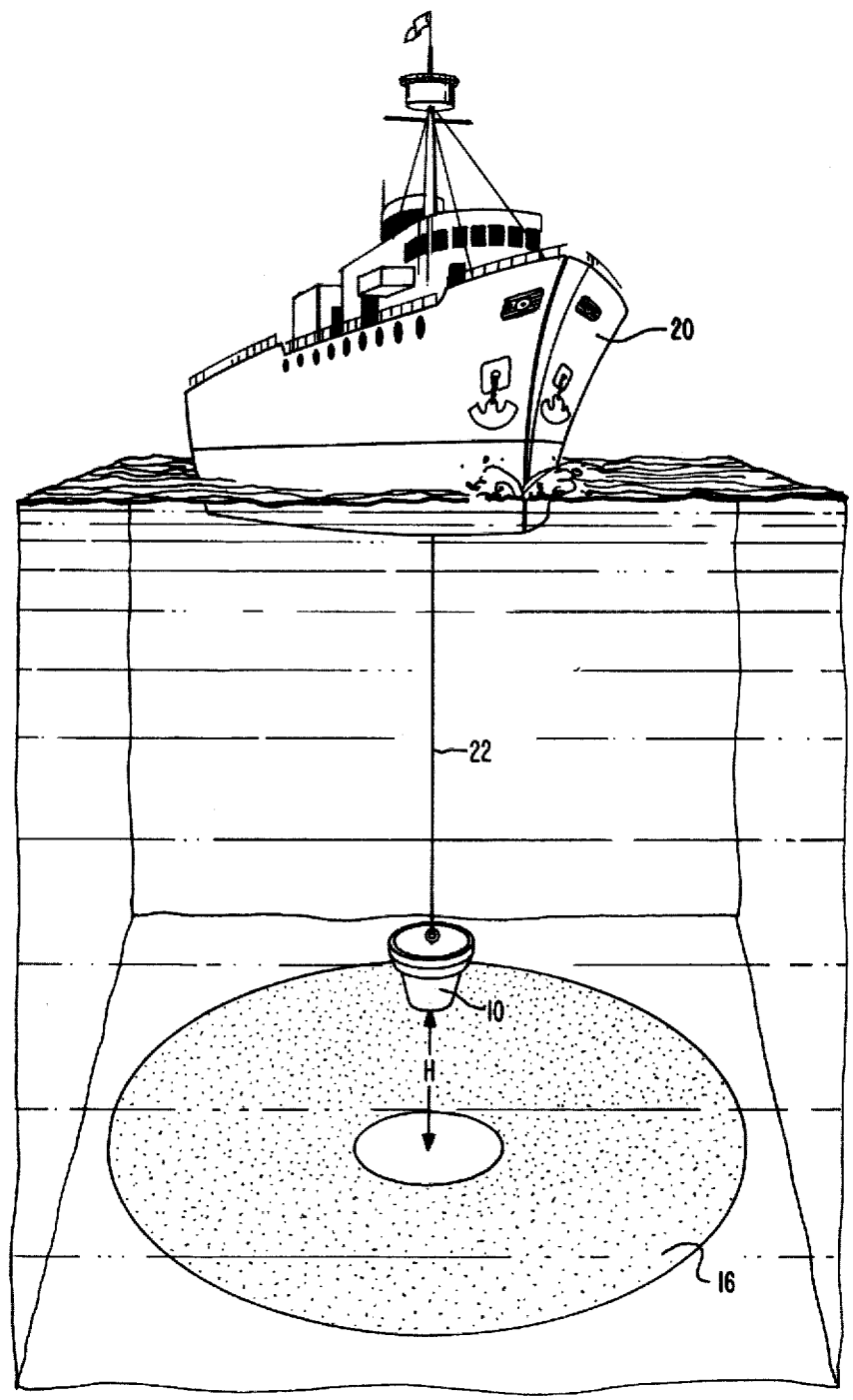

FIG. 2 illustrates another carrier in the form of a surface vessel 20 supporting the acoustic camera 10 at an altitude H for imaging the target area 16. A telescoping shaft or as illustrated a cable 22 is provided to position the lens at the desired distance H above the bottom. Other forms of carriers such as underwater military or research vehicles, or stationary platforms may also be utilized.

Figure 3A:
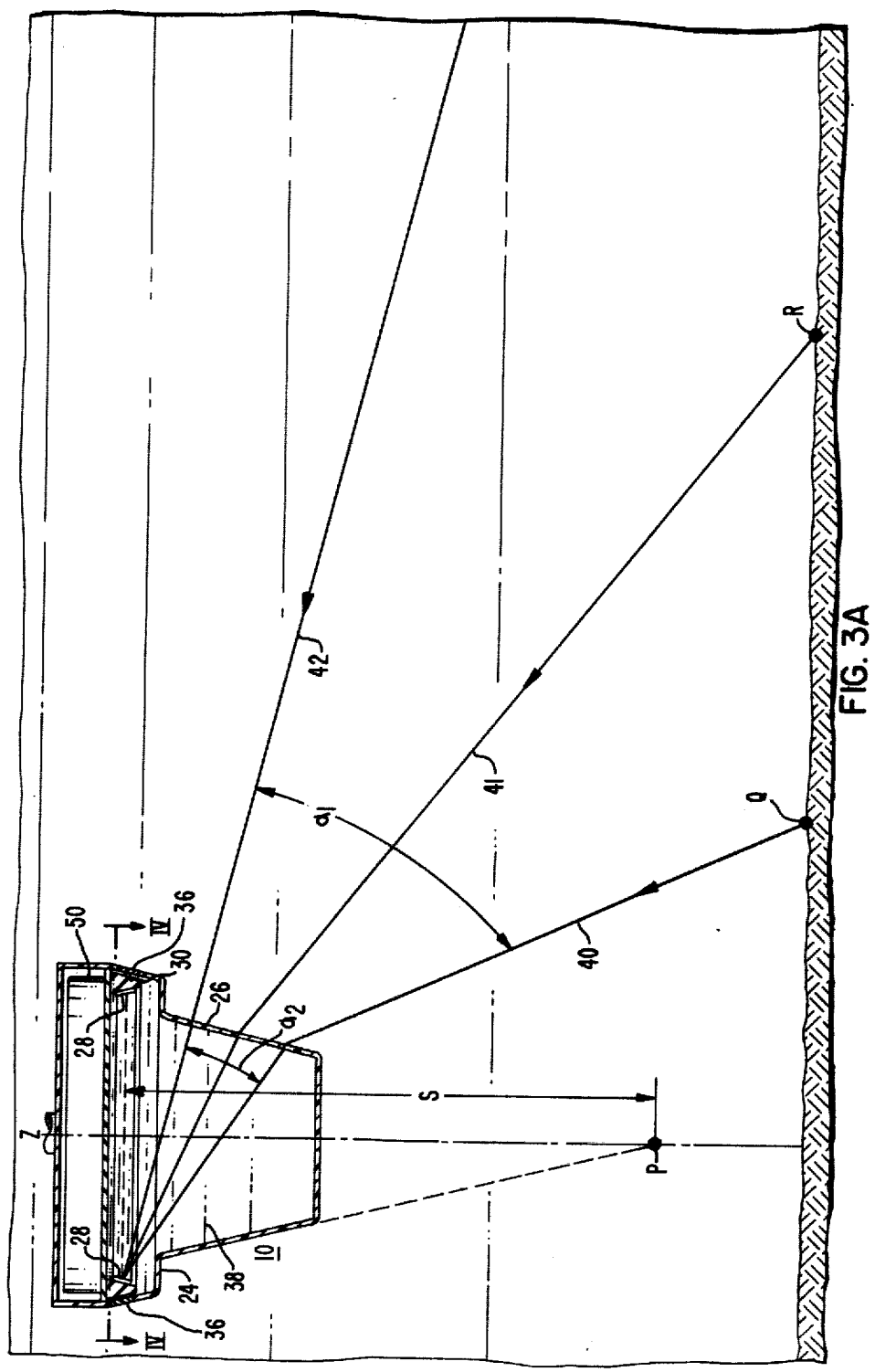
FIG. 3A is an elevational view, partially in section, of the acoustic camera in operation over a target area.
Figure 3B:
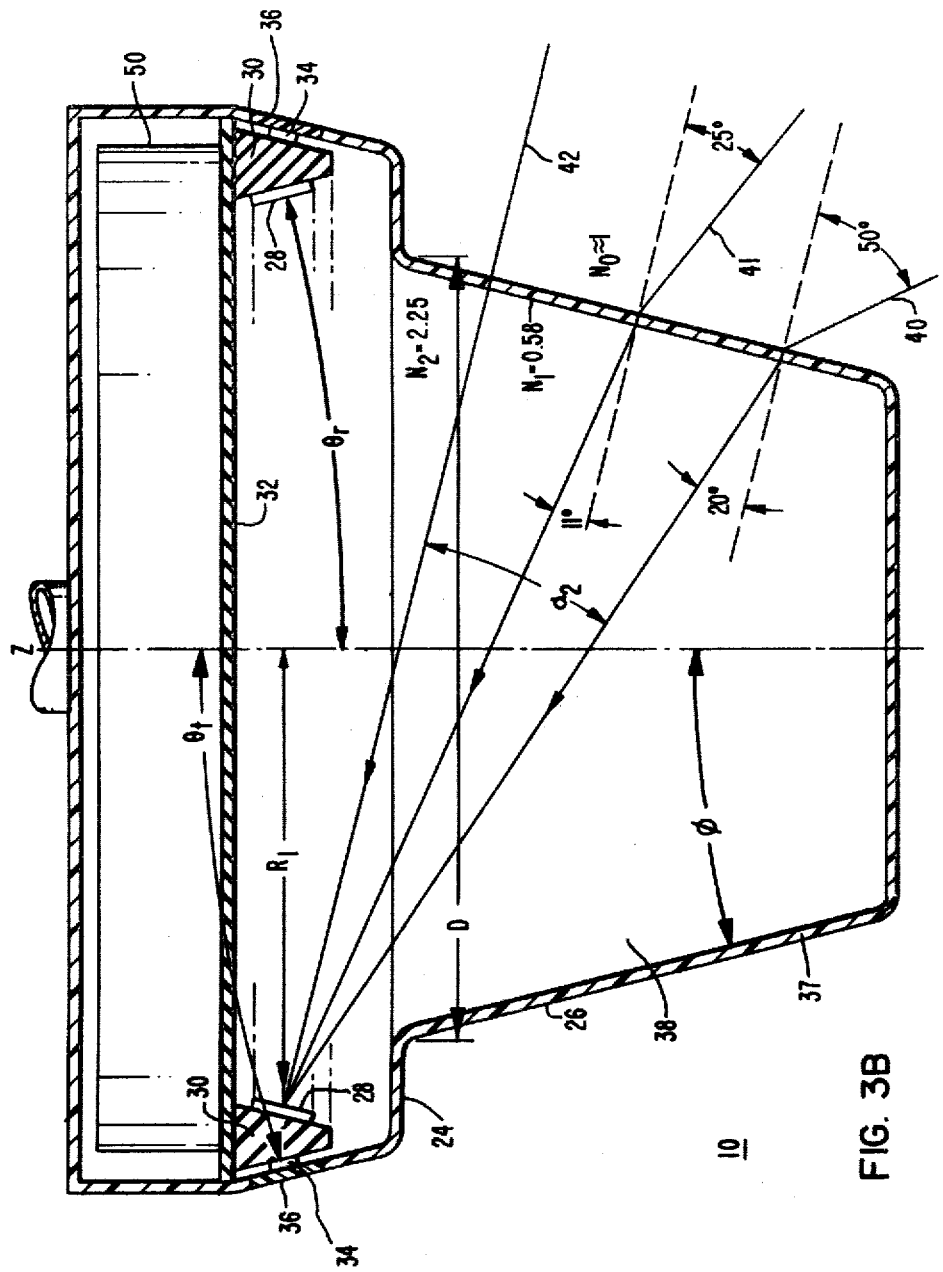
FIG. 3B is an enlarged sectional view of the acoustic camera shown in FIG. 3A.

One form of acoustic camera for imaging a 360° degree area beneath the carrier is illustrated in FIGS. 3A and 3B. The acoustic camera 10 has a housing structure 24 including a generally conical lens portion 26 symmetrically disposed about axis Z which is vertical during operation.

Disposed inside housing 24 is a plurality of active transducer elements 28 which are used as acoustic receiving elements arranged with their active faces on the circumference of a circle which lies in a plane perpendicular to axis Z and above lens portion 26. The circle has its center coincident with axis Z and has a radius of $R_1$.

The ring of transducers 28 may be backed by a baffle material 30, and the active elements are arranged with their active faces at an angle relative to axis Z so that they collectively lie on the surface of an imaginary cone whose apex is located above the camera 10. A sound absorbing baffle 32 can be used to minimize reflection from the top surface of the lens.

The area 16 of FIGS. 1 and 2 which is to be imaged can be sonified in a number of ways. A burst of sonic energy can be simultaneously transmitted from the ring of transducer elements 28. If this is done then TR (Transmit-Receive) circuits are required. Another method is to mount a ring of active transducer elements 34 in the top portion of the housing 24 outside of the ring of receiving elements 28. These elements 34 can be mounted on the inside or outside of the housing 24. However, if mounted on the inside, it may be desirable to use an acoustic window 36 of a material such as polyurethane in order to couple energy efficiently into the water. The projector elements 34 form a truncated shell which has its apex on the axis Z at a point below the lens.

From a design standpoint, lens portion 26 may be made of a solid material having a velocity of sound less than the surrounding seawater, one example being RTV silicone rubber or alternatively and as illustrated in FIG. 3B, lens portion 26 may be comprised of a relatively thin outer shell 37 such as polyethylene containing a lens liquid 38 having a velocity of sound less than that of seawater, such as a fluorocarbon or trichlorotrifluorethane.

A typical index of acoustic refraction $N_2$ for the lens liquid 38 is 2.25 and for the shell material $N_1$ is 0.58. The index of refraction $N_0$ for the surrounding water is approximately unity. FIGS. 3A and 3B show three acoustic rays 40, 41, and 42 in the plane of the conical axis Z that obey Snell's diffraction law as they pass from the water into the shell 37 and into the lens liquid 38. Ray 40 is from a point A at minimum range, ray 41 is from some intermediate point B and ray 42 is from a point at maximum range. In the vertical plane illustrated in FIGS. 3A and 3B, these rays are diffracted as they pass from the water into the lens liquid. However, since the lens-to-water interface is a straight line there is no focusing action in the vertical plane. The height of the transducer elements should be chosen so they will accept energy over the vertical angle $\alpha_2$. This angle $\alpha_2$ is considerably less than the angle $\alpha_1$, the difference between the grazing angle at minimum range and that at maximum range.

Having a specified height and minimum and maximum range for a particular mission the acoustic camera can be designed utilizing a variety of independent variables such as: frequency, the index of refraction $N_2$ of the lens liquid, the radius $R_1$ of the circle on which the transducer elements are to be located, the cone half angle $\phi$, and the distance S from the plane of the circle whose radius is $R_1$ to the lens cone apex at point P.

In order to minimize the length of the leads from the transducer elements, the amplifiers associated with all of the elements can be mounted in the electronic package 50 located in the top of the housing structure 24. Most lens liquids are good insulators so the electronic package can be immersed in the lens fluid.

The effective aperture width of the lens is generally 50% to 70% of the diameter D as measured at the top of the conical lens portion 26.

Figure 3C:
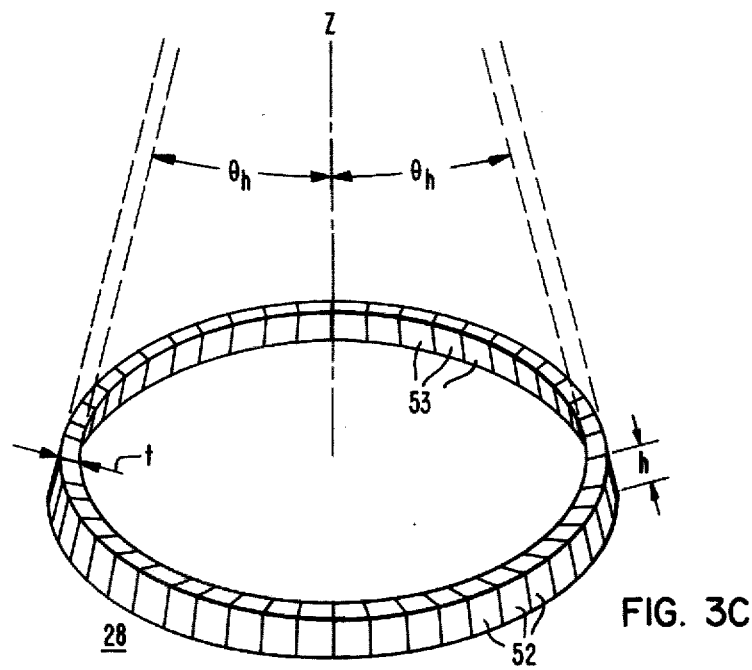
FIG. 3C is a perspective view of a 360° array of piezoelectric receiving transducer elements for use with the acoustic camera of FIG. 3B.

A perspective view of the receiving transducer elements is shown in FIG. 3C. They form a conical shell segment with a cone half angle of $\theta_h$. These elements could be made of rectangular blocks of PZT 8 (Navy III) or other piezoelectric material. The outside faces 52 would be mounted to the baffle ring 30 of FIG. 3B while the inside faces 53 would receive energy through the lens liquid 38. The thickness t would be resonant at the operating frequency and the height h would be chosen to have the desired vertical beamwidth $\alpha_2$ for use with the lens. Elements will be poled in the thickness direction and will have an electrode on the outer faces 52 and inner faces 53.

Figure 3D:
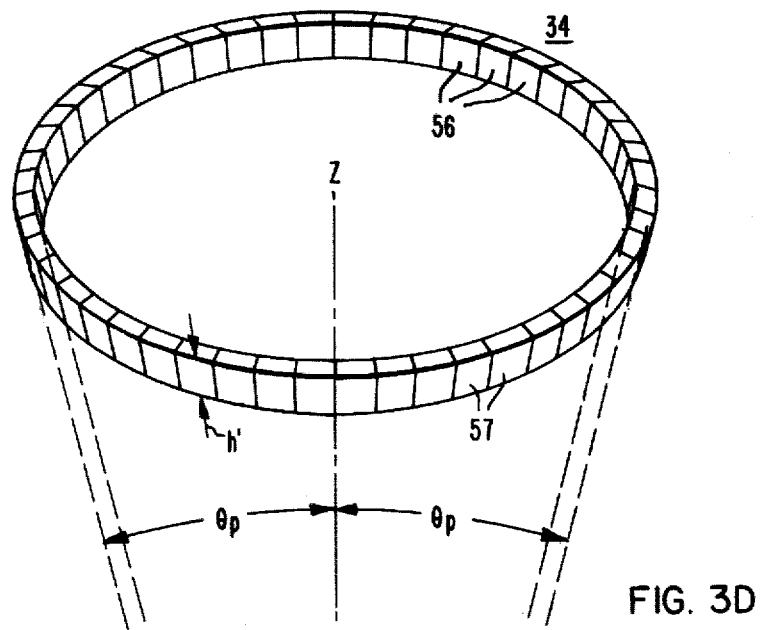
FIG. 3D is a perspective view of a 360° array of piezoelectric transmitting elements for use with the assembly of FIG. 3B.

One way to sonify the area which is being imaged by the sonar is shown in FIG. 3D. It is similar to the receiving array of FIG. 3C except that the apex of the cone is below the array and the baffle (not shown) would be located against the inside faces 56 of the ring of elements 34. Each element radiates energy from the outside face 57. All of the elements can be driven in parallel to sonify a region of the sort shown in FIGS. 1 and 2. The cone half angle is $\theta_p$ and is normally made equal to the grazing angle at the maximum range of interest because that is where the maximum power is desired. The height h' will normally be less than one wavelength.

Figure 4B:
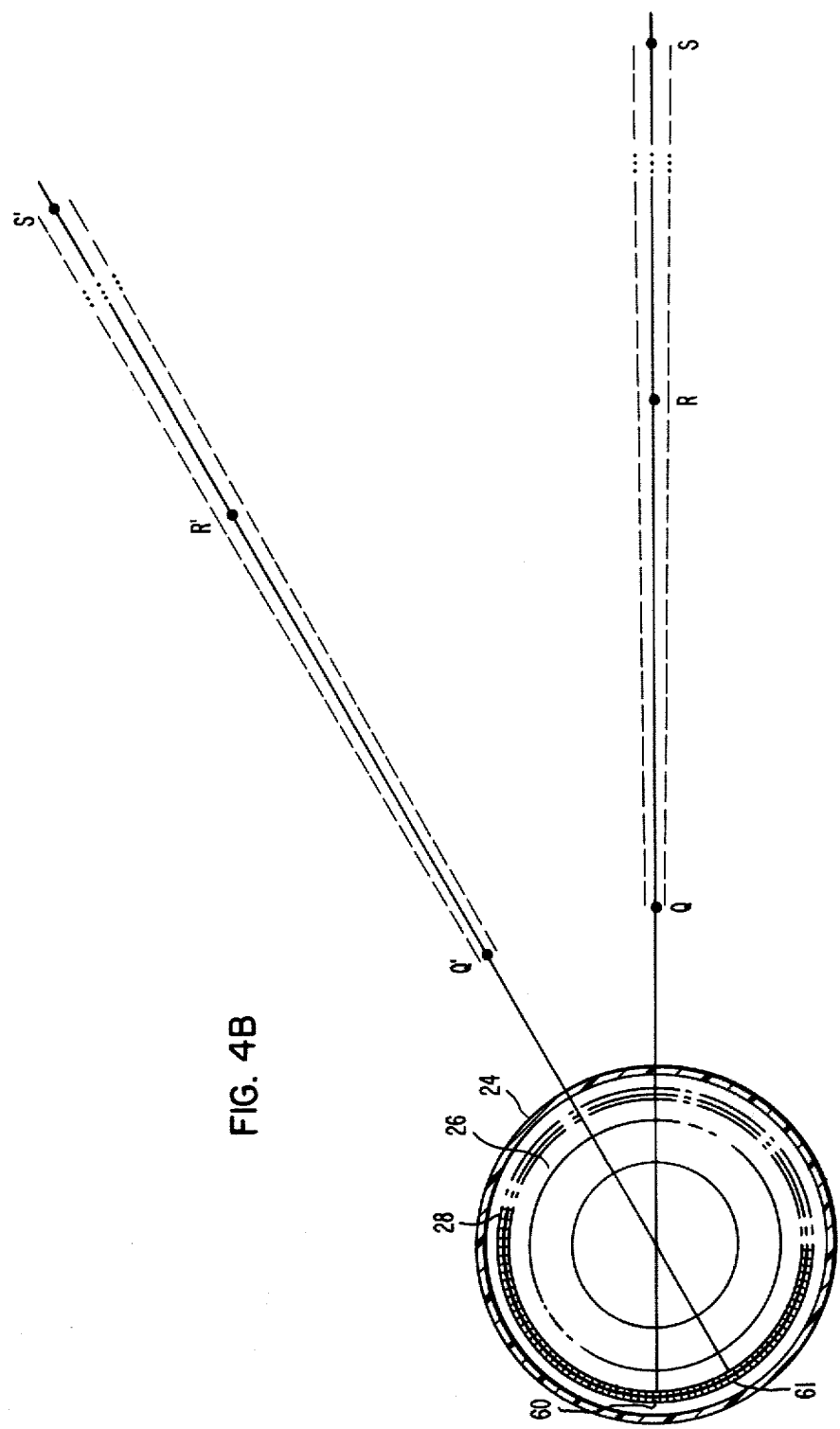
FIG. 4B is a plan view along line IV—IV of FIG. 3A that illustrates the intersection of two focused fan beams with the target area.

The projector is designed to sonify the target area directly below the camera apparatus from a minimum range of interest out to a maximum range. In an operation similar to sidelooking sonar, acoustic returns thereafter are received on a time basis from incremental range cells of the target area. FIG. 4A illustrates the focusing action on returns from points Q, R, and S impinging upon the same transducer element 60 as a result of the lens portion 26. Point Q corresponds to the minimum range $R_{min}$ and returns therefrom would be received first and subsequent returns from incremental range cells would be received up until point S corresponding to the maximum range $R_{max}$. Point R represents some intermediate point.

The lens focusing action tends to focus the energy from line QRS onto transducer element 60 whereas acoustic returns from another radial line Q'R'S' are focused onto a different transducer element 61. There will be as many radial focused lines as there are transducer elements. In actual practice, the energy received by each individual transducer element is representative of a narrow elongated area on the bottom as indicated by the dotted areas around lines QRS and Q'R'S' shown in FIG. 4B. At each range the width of the area is proportional to the slant range. The angular resolution of each individual beam is inversely proportional to the diameter D of the lens and also inversely proportional to the frequency employed. By way of example, to image a 360° area, 720 active elements may be utilized to obtain a coverage with an angular resolution of 0.5° using a lens diameter of about 170 wavelengths.

As seen from FIGS. 3A and 3B and 4A and 4B, the generally conical lens operates to focus the energy in the azimuth direction, but not in the vertical direction. This is in accordance with the desired beam formation for sidelooking sonar imaging.

Figure 5:
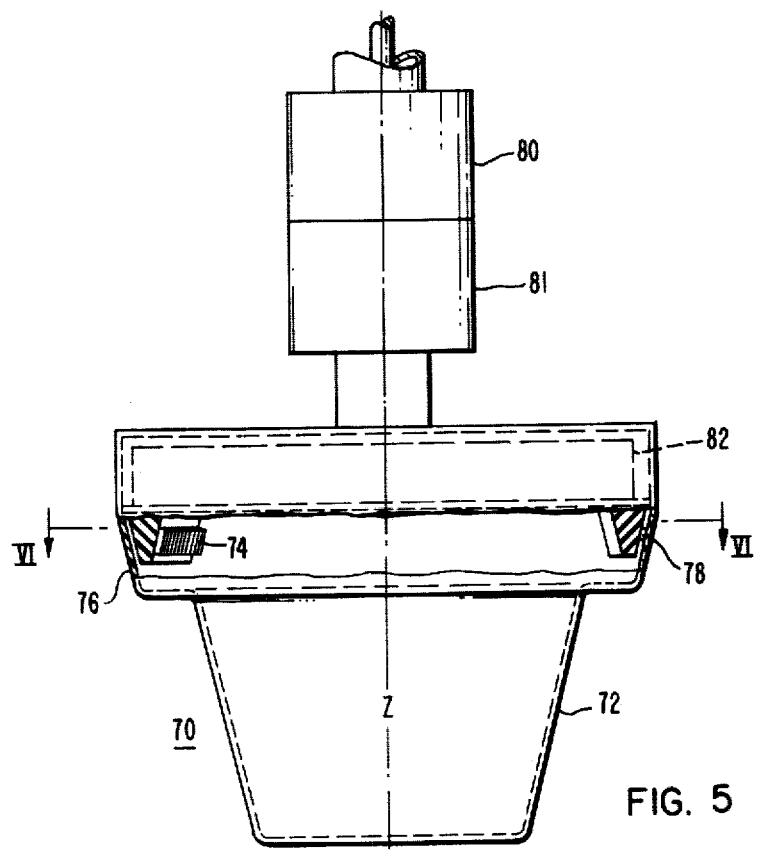
FIG. 5 is a side view of the acoustic camera utilized in a rotational mode.

FIG. 5 illustrates an embodiment of the invention which reduces the costs of the acoustic camera by reducing the number of active transducer elements and their associated signal processing channels. The acoustic camera 70 of FIG. 5 includes a lens portion 72, and a plurality of active transducer elements 74 all disposed within a housing 76. The number of active elements, however, is reduced to 144 so as to form 144 radial lines or elongated areas, each with a 0.5° angular resolution, the totality occupying a 72° sector of the target area. The active elements still lie along the circumference of a circle disposed above lens portion 72 and having its center coincident with vertical lens axis Z. A plurality of active elements forming a projector 78 is disposed at the top of the lens portion 72 to sonify a 126° sector of the target area.

If the unit is designed for a constant rotation rate, the sector sonified by the projector must be wider than that covered by the receiving beams. This will subsequently be evident from FIGS. 8 and 9.

The acoustic camera 70 is arranged for rotation about the axis Z and is connected to a drive motor 80 which contains a rotatable coupler 81. Such coupler 81 will cover a frequency band of two decades so that it can be used to deliver AC power from the carrier or towing vehicle to an electronics package 82 and simultaneously conduct video information from the electronic package to a video display on the carrier or towing vehicle.

Figure 6:
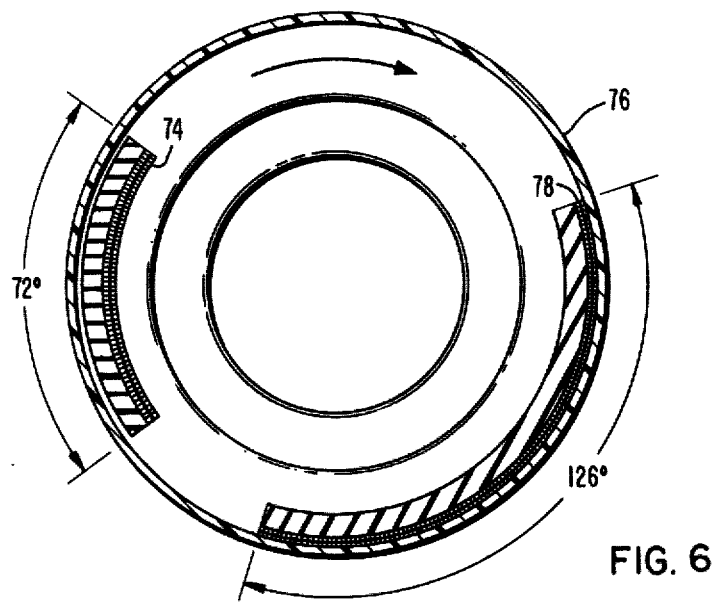
FIG. 6 is a view along the line VI—VI of FIG. 5.

FIG. 6 is a view along line VI—VI of FIG. 5, and includes by way of example 144 transducer elements 74 covering a 72° arc. A 126° sector is sonified by the projector elements 78 and imaged by a set of focused receiving means formed by the lens portion 72 and the array of receiving elements 74. The projected energy is not focused by the lens.

Figure 7:
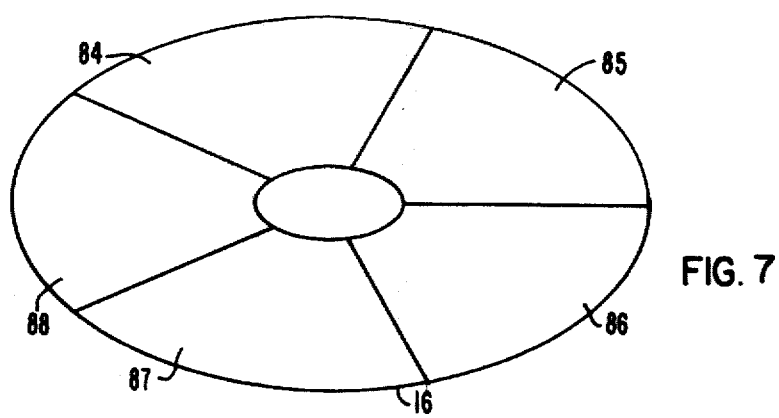
FIG. 7 is a perspective view of the sector coverage obtained with a stepped rotation of the acoustic camera of FIG. 5.

FIG. 7 illustrates a perspective view of the target area 16 divided into 72° sectors 84 through 88. In operation, the acoustic camera may be stationary and an acoustic pulse transmitted to sonify a particular sector, after which the acoustic returns are received therefrom, so as to display that particular sector. Thereafter, the apparatus may be indexed by 72° to image the next sector and the process repeated until the full 360° target area is imaged. Alternatively, the apparatus may be continually rotated, for example, at a rotational speed of 600 rpm so that a full 360° coverage could be obtained in 0.1 second. The apparatus may be towed while being rotated and for a maximum tow speed of, for example, 3 knots, a slightly distorted but entirely satisfactory picture would be obtained because the vehicle would only move one-half a foot during every rotation of the lens.

Figure 8:
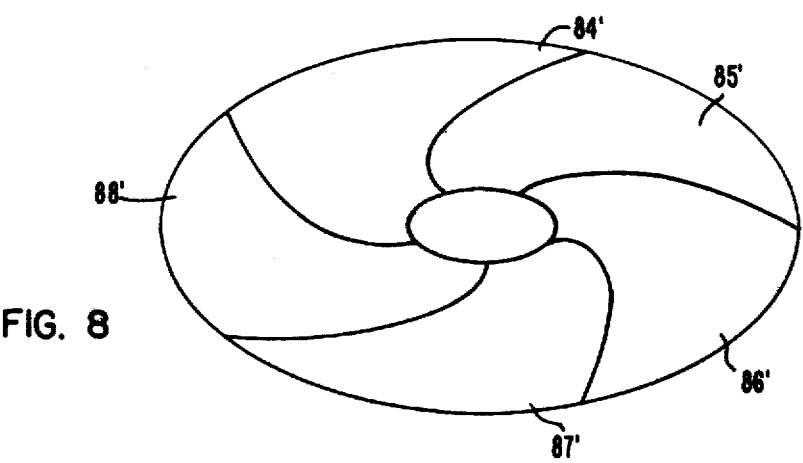
FIG. 8 is a perspective view of the sector coverage with a continuous rotational mode.

FIG. 8 illustrates a perspective view of plurality of sectors 84' through 88' imaged as a result of operation in a continuously rotating mode. Each sector is essentially spiral shaped because the array of receiving transducer elements rotates through 72° between transmitted sonifying pulses.

Figure 9:
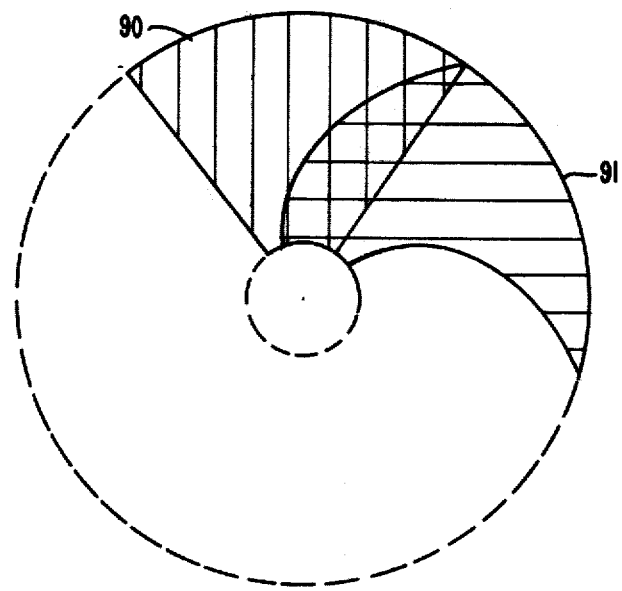
FIG. 9 illustrates a plan view of the target area sonification required for obtaining sector coverage as in FIGS. 7 and 8.

FIG. 9 illustrates the imaged area 90 (vertically shaded) for a single transmitted pulse as a result of the indexing mode of operation, whereas area 91 (horizontally shaded) represents the imaged area for a single pulse as a result of the continuous rotation mode of operation.

Figure 10:
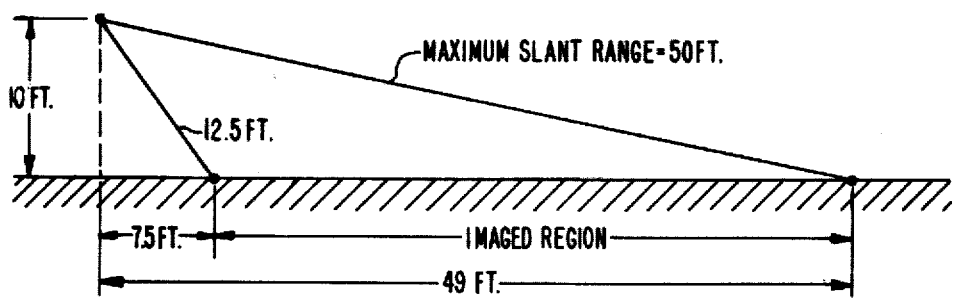
FIG. 10 illustrates the minimum and maximum slant ranges employed in one embodiment of a rotating lens camera.

Let it be assumed by way of example that the apparatus of FIG. 5 is utilized in a continuously rotating mode of operation at an altitude of 10 feet above the target area and is to image an area from a minimum range of 7.5 feet (12.5 foot slant range) to a maximum range of 49 feet (50 foot slant range) as illustrated in FIG. 10.

Figure 11:
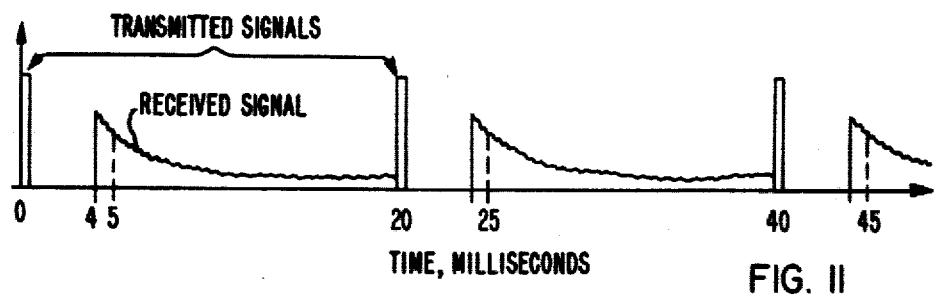
FIG. 11 illustrates the transmitted and received signals on one channel as a function of time.

FIG. 11 illustrates the time of the transmitted and received signals. It requires 20 ms for a signal to travel out 50 ft. to the maximum range and return so the transmitted pulses can be separated by 20 ms. A bottom return is received 4 ms after each transmitted pulse and a return from the minimum slant range of interest is received 5 ms after a burst of sonic energy is transmitted.

Figure 12:
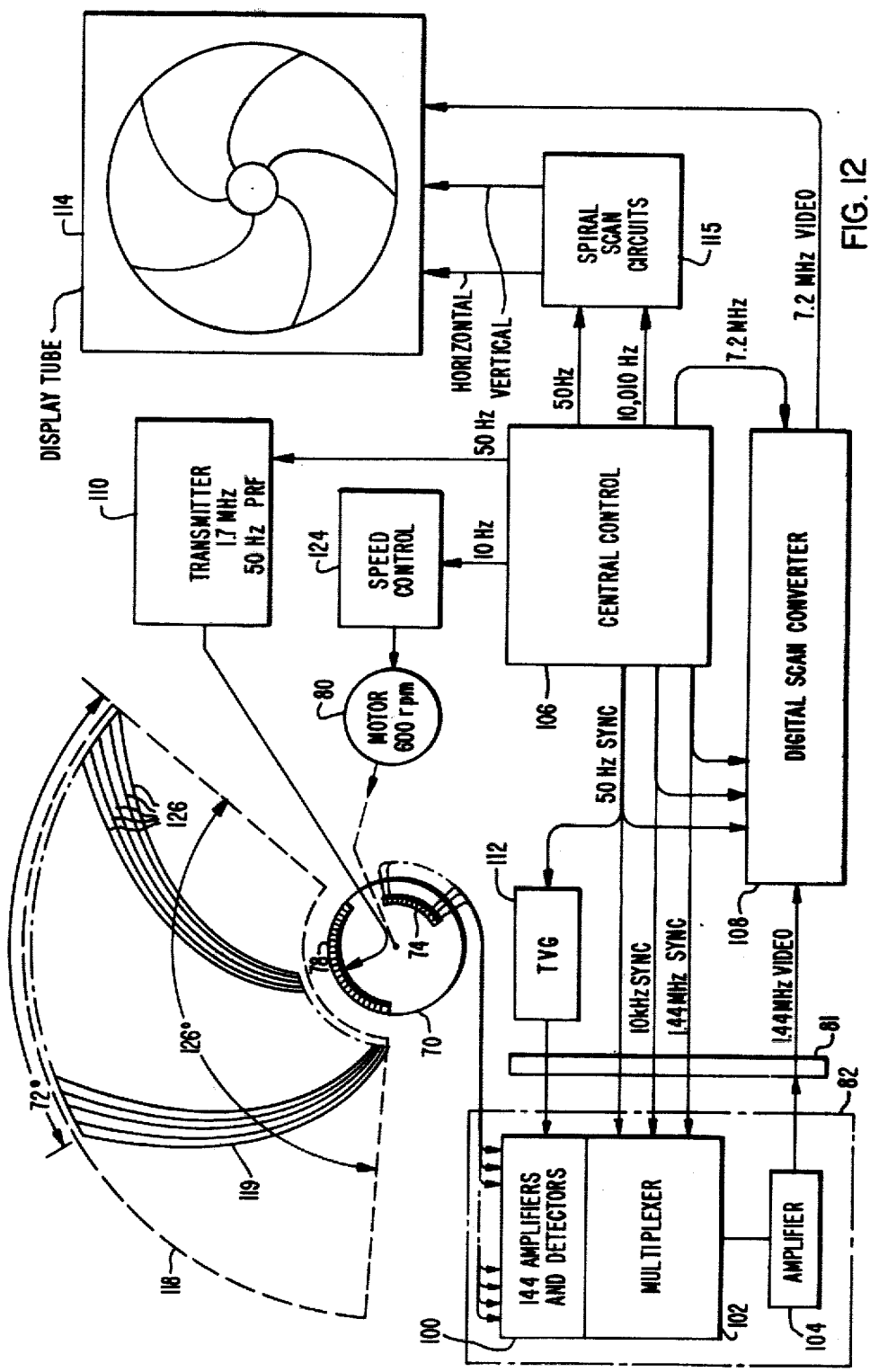
FIG. 12 is a block diagram of an apparatus for imaging the target area.

FIG. 12 is a block diagram for such a sonar, and by way of example, an array of receiving means are formed that will cover a 72° sector. With such an arrangement it is desirable to rotate the electronic package 82 which contains the many required amplifiers and detectors 100, multiplexer 102 and amplifier 104, so that a single video signal can be brought out through the rotating coaxial coupler 81.

A pulse repetition frequency (PRF) of 50 Hz can be used because it takes sound 1/50 second to travel 50 feet and return. During that time the lens will rotate one-fifth of a revolution or 72°. The lens rotation rate is one revolution in 0.1 seconds, 10 rps, or 600 rpm. An angular resolution of 0.5° is assumed in this example. Consequently 144 receiver transducer elements are required to cover the 72° sector. To achieve this resolution will require a lens diameter D (FIG. 3B) of about 200 wavelengths. For a 50 foot range a sonar frequency of 1.7 MHz is practical. The wavelength is 0.0353 inches so D=7 inches and the complete lens assembly would have a diameter of about 9 or 10 inches.

The 144 received signals are amplified and detected in unit 100 and multiplex unit 102 then samples each channel in sequence. All of the channels must be sampled in a time which is equal to or less than the time associated with the range resolution. In this example, it is assumed that a range resolution of 3 inches is desired so consequently, the projected pulse length will be 100 microseconds ($\mu$s). A suitable sampling rate is 1.44 MHz so that all of the 144 channels can be sampled once every 100 $\mu$s. A 10 kHz synchronizing pulse initiates the sampling sequence once every 100 $\mu$s. These synchronizing and sampling pulses are provided to multiplexer 102 from a central control unit 106.

The resulting 1.44 HMz video signal is amplified in unti 104 and fed through a rotating coupler 81 and to a digital scan converter 108, where information is stored for future display.

A time varied gain circuit (TVG) 112 varies the gain of the 144 amplifiers at a 50 Hz rate to compensate for the variations in received signal level from minimum to maximum slant range. This is similar to the TVG circuit in a conventional side look sonar.

In this example there are 150 range cells between the minimum slant range of 12.5 feet and a maximum slant range of 50 feet. Consequently, the scan converter unit 108 must store 150×144=21,600 picture elements (pixels) during the time energy is being received from each transmitted pulse. In order to store information for a complete 360° image, five sectors must be stored which contain a total of 108,000 pixels. If an image is to be displayed with an 8-step gray scale, then three bits of binary storage are needed for every pixel. This requires a total storage of 324,000 bits. Conventional scan converters for side look sonar have been built that store as many as $10^6$ bits.

The display unit 114 consists of a round faced cathode ray tube (CRT) with a single electron gun whose beam is intensity modulated by the video signal from the scan converter. The electron beam trace is caused to spiral from the inside out making 150 revolutions. It is then blanked during the time required to return to the center for the next sweep. The signals required to drive the horizontal and a vertical deflection coils are generated in unit 15. In this example, it is assumed that pictures are to be displayed at a 50 Hz rate and that the rotation rate of the spiral trace is 10.010 kHz, as will be subsequently explained. During each revolution $144 \times 5 = 720$ pixels are displayed. Information is read out of the scan converter at five times the rate that information is fed into the unit. The maximum video frequency to the display is 7.2 MHz.

The transmitter 110, under control of central control unit 106, delivers 100 µs pulses of 1.7 MHz at a 50 Hz PRF to the arc-shaped projector array 78 which rotates with the lens. A sector 118, on the target area, with a width of 126° or more must be sonified to insure complete coverage of the spiral shaped receiving area 119. The transmitted PRF is 50 Hz so that five pulses are transmitted during each revolution of the lens.

Figure 13:
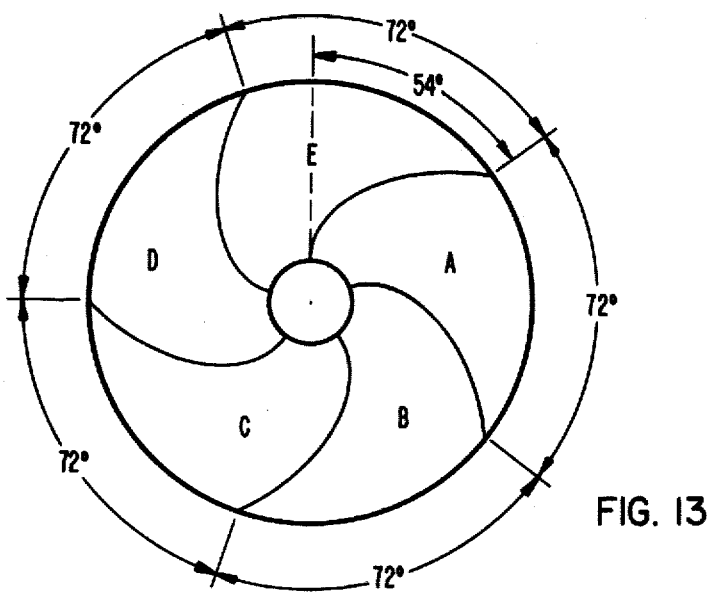
FIG. 13 is a plan view of the target area showing five spiral sectors that are searched in sequence by a rotating acoustic camera.

FIG. 13 illustrates the five spiral sectors from which sonic energy is received from successive transmitted pulses.

The acoustic camera 70 is rotated by motor 80 and a speed control unit 124 receiving 10 Hz synchronizing pulses from the central control unit 106 maintains the motor speed at the desired 600 rpm.

The conical lens portion of the acoustic camera focuses energy from the 144 spiral stripes 126 of area 119 onto arc-shaped array 74 of 144 receiver transducer elements.

Figure 14:
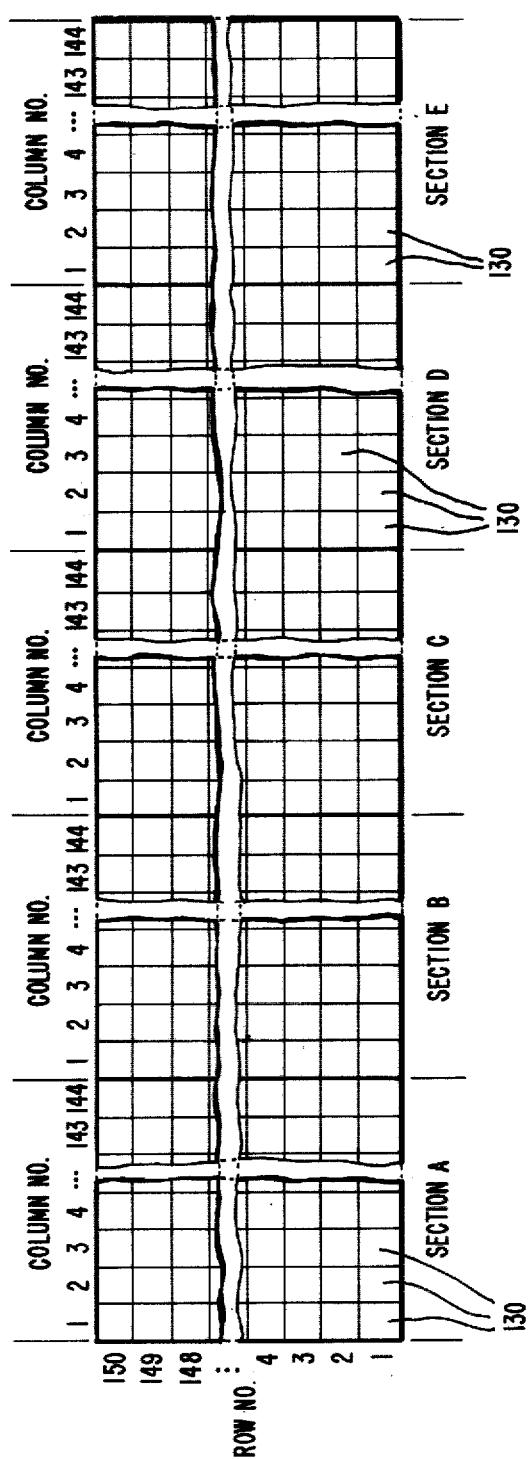
FIG. 14 is a block diagram of a scan converter storage unit.

FIG. 14 is a block diagram representation of a plurality of storage bins 130 in the scan converter unit 108. The unit contains five identical sections A, B, C, D and E. Each of these stores information relating to the pixels in one of the five 72° sectors that go to make up a complete 360° picture to image the five sectors A, B, C, D and E shown in FIG. 13. In this example there are 150 rows corresponding to 150 range pixels for every ½° of angular resolution. In each section there are 144 columns corresponding to the 144 circumferential pixels associated with each range increment. Each storage bin 130 contains the information concerning one pixel of the display. This information can be stored in binary form. For example, to store eight signal levels requires a three bit storage for every pixel since $2^3 = 8$.

Information is read into the scan converter in real time as it is received. A 100 µs pulse of sonic energy is transmitted into the water. Five milliseconds later information is received simultaneously on 144 receiving channels regarding the bottom at the minimum slant range of 12.5 ft. During a time of 100 µs these 144 signals are stored in Section A, Row 1, Columns 1 through 144. In the next 100 µs information about the range of 12.75 ft is received on the same 144 receiving channels. These signals are stored in Section A, Row 2, Columns 1 through 144. In the next 100 µs all of the columns in Section A, Row 3 are filled. This process continues until 20 ms after the transmitted pulse when energy from a slant range of 50 ft is received and stored in Section A, Row 150, Columns 1 through 144. Then another pulse is transmitted and after 5 ms information is received from the minimum slant range of Sector B by the 144 receiving beams. This information is stored in Section B, Row 1, Columns 1 through 144. In the next 100 µs information is stored in Section B, Row 2, Columns 1 through 144. The entire Section B is filled with pixel information from Sector B. A third pulse is transmitted and Section C is filled with pixel information concerning Sector C. In a similar manner, Sections D and E are filled with information received from pulses four and five respectively. After 1/10 second the lens has returned to its initial angular position and the process is repeated. The old information in Section A is replaced with the new information associated with Sector A.

Figure 15:
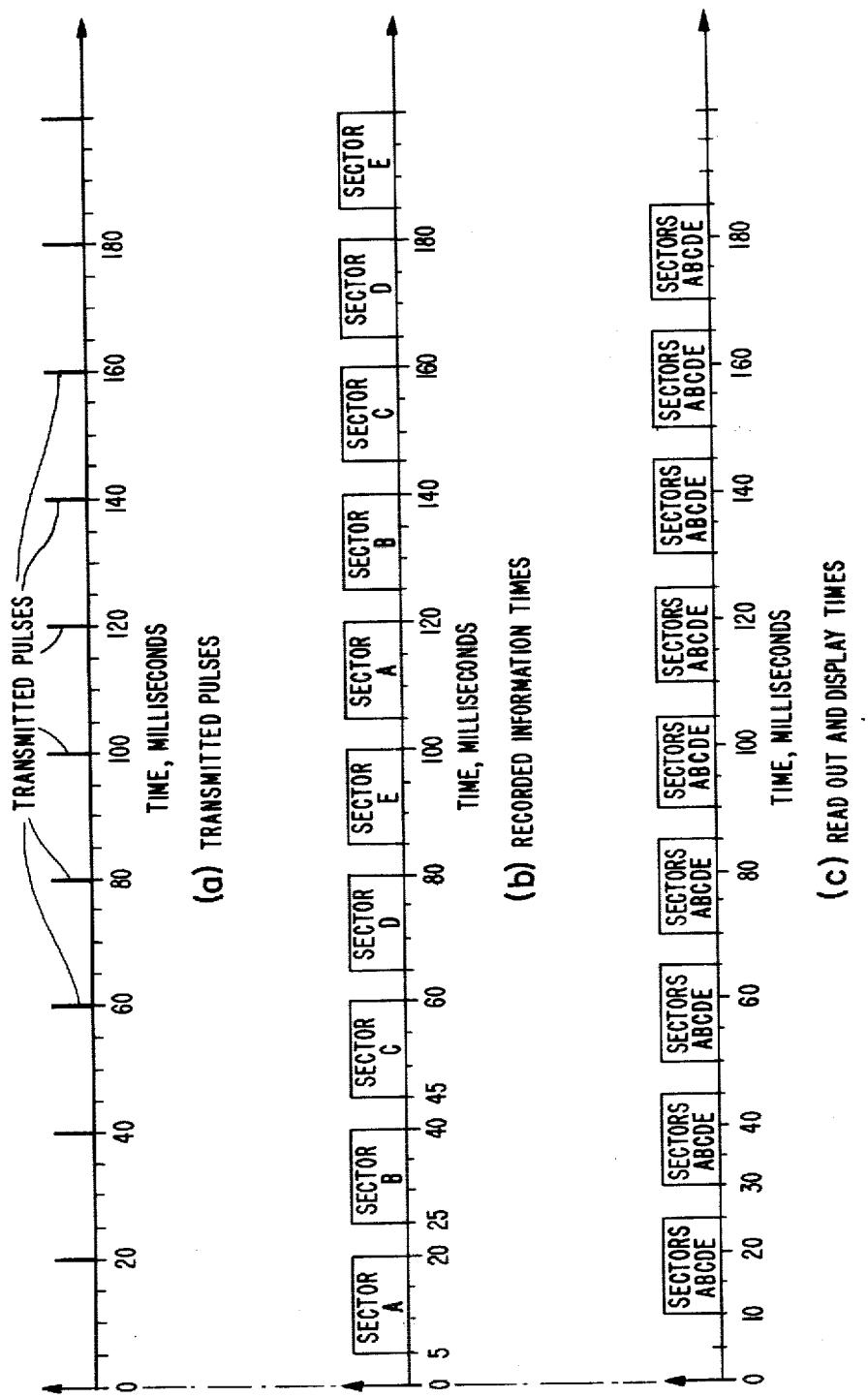
FIGS. 15A–C illustrates the times when information is recorded and the times when this information is read out from the scan converter to the display of FIG. 12.

If information were read out of the scan converter at the same rate that it was read in, then it would take 1/10 second to display a complete 360° image and the 10 frames per second display rate would cause objectionable flicker. Consequently all of the pixel information stored in five sections A, B, C, D and E of the scan converter are read out once every 20 ms so that frames are displayed 50 times per second. In order to avoid reading information out from any pixel storage element at the same time information is being stored, the picture information is read out in the 15 ms time intervals shown in FIG. 15. Ten milliseconds after a transmitted pulse, stored picture information in the scan converter memory starts to be fed to the display. Fifteen milliseconds later all of the information in the five sections have been read out and displayed. Then 5 ms are allowed for the display retrace and the process is repeated. Information is read out in the following order: Section A, Row 1, Columns 1 to 144; Section B, Row 1, Columns 1 to 144; Section C, Row 1, Columns 1 to 144; Section D, Row 1, Columns 1 to 144; Section E, Row 1, Columns 1 to 144; then Row 2 of Sections A, B, C, D and E, then Row 3 of Sections A, B, C, D and E, etc., until Row 150 of Sections A, B, C, D and E have been read out and displayed. When information is read out from each pixel storage cell it is not destroyed. As new information is written into the storage unit old information is erased and can be erased one row at a time.

The input information rate is:

$$\frac{\text{Pixels per section}}{\text{Record time}} = \frac{144 \times 150 \text{ pixels}}{15 \text{ ms}}$$

$$= \frac{1440 \text{ pixels}}{ms} = 1.44 \text{ pixels}/\mu s$$

The output information rate is five times greater, $5(1.44) = 7.20$ pixels/µs.

FIG. 15(a) illustrates the times that pulses are transmitted. FIG. 15(b) shows the time intervals when information for each sector is received and stored. FIG. 15(c) shows the time intervals when all of the stored pixel information is read out of the scan converter and is displayed on the cathode ray tube (CRT).

If the scan converter stores information in a digital form then the input analog signal must be converted to digital form with an analog to digital converter. The output from the scan converter thereafter must have the digital signal converted back to an analog form in a digital to analog converter before it is fed to the grid of the CRT.

Figure 16:
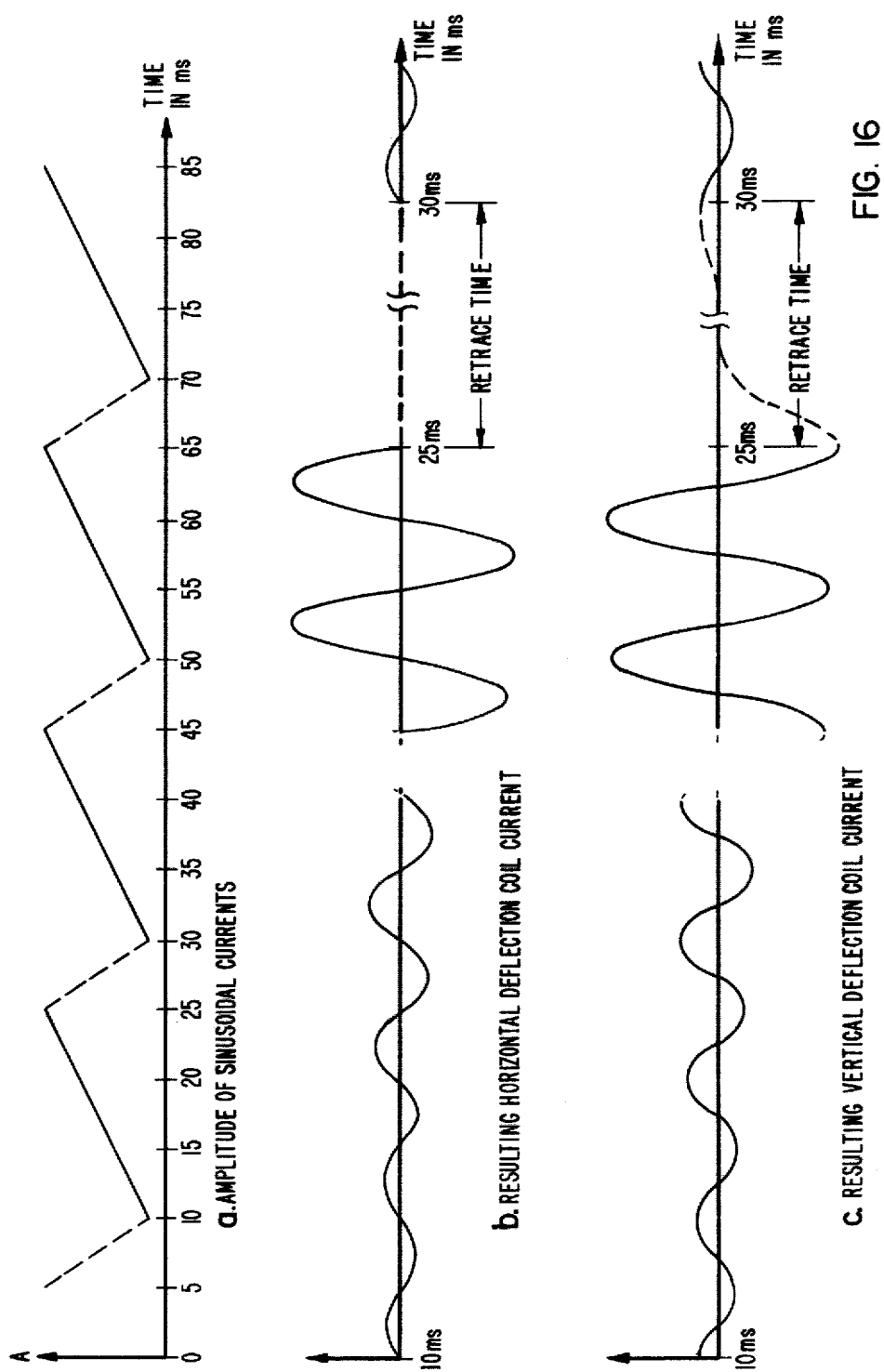
FIGS. 16A–C illustrates the nature of the signals associated with the deflection coils of the cathode ray display tube of FIG. 12.

The desired spiral display can be produced by providing to the horizontal deflection coil of the CRT a current which is of constant frequency but which is amplitude modulated in a saw tooth manner, as illustrated in FIGS. 16(a) and (b). The current to the vertical deflection coil is of the same frequency and is amplitude modulated in the same manner but is 90° out of phase with the horizontal current as illustrated by FIGS. 16(a) and (c).

The desired sinusoidal deflection frequency must be chosen so as to produce the desired display. In a time of 15 ms the spiral scan should make $(150 + \Delta)$ revolutions, where $\Delta$ is the fraction of a revolution required to cause each of the five sectors to be displayed in the spiral manner shown in FIG. 13. In this example $$\Delta = 54°/360° = 0.150 \text{ revolution}$$

The deflection frequency f is then the number of revolutions divided by the spiral scan time:

$$f = (150 + 0.150)/0.015 \text{ ms} = 10,010 \text{ Hz}$$

Figure 17:
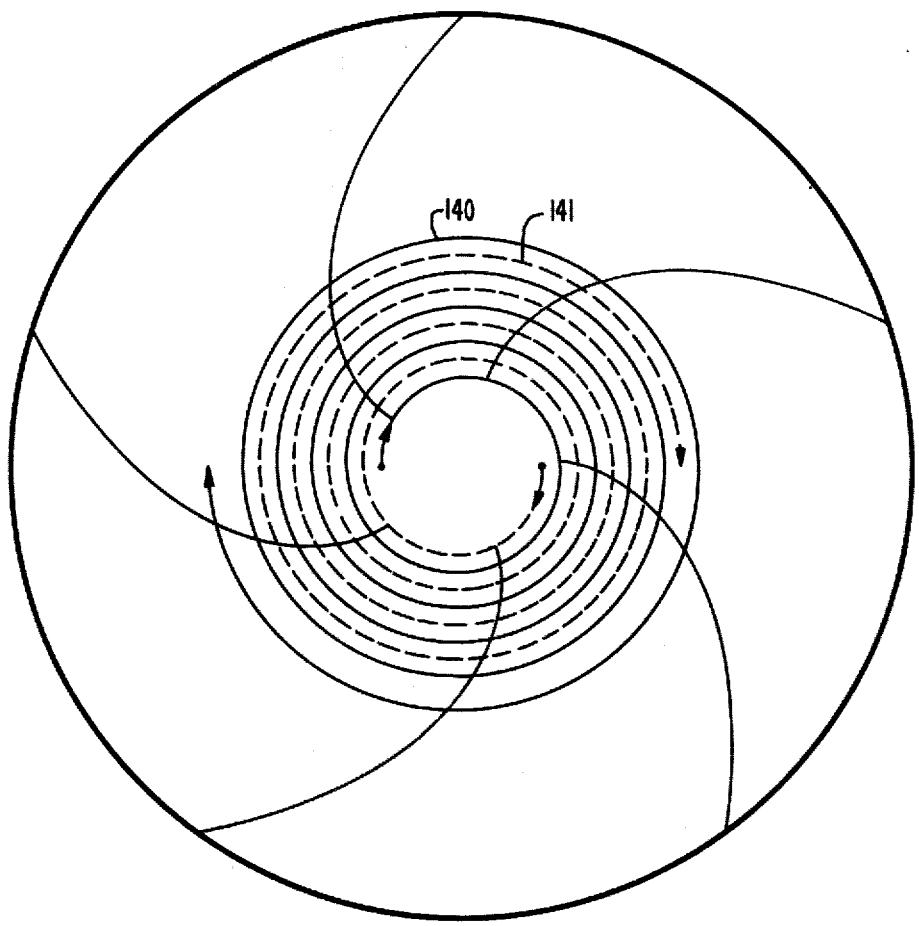
FIG. 17 illustrates a double spiral display method that interlaces odd and even fields.

FIG. 12 provides an example of an imaging sonar using a particular set of parameters. The number of sectors used can be less or greater than the five shown in the example. For a given range and resolution a large number of sectors reduces the number of receiving channels required but it also increases the time required to search a complete 360° area. A picture frame rate of 50 or 60 Hz is desirable to avoid flicker. However, a spiral interlace method as illustrated in FIG. 17 can be used. This is analogous to the line interlace now employed in commercial TV. On odd fields the electron beam locus is that described by the solid line 140 and on even fields the locus is that described by the dotted line 141. If this technique were applied to the apparatus of FIG. 12 the field rate would be reduced from 50 Hz to 25 Hz and the circular scan rate from 10,010 Hz to 5,050 Hz. Consequently the maximum video frequency from the scan converter would be reduced by a factor of four to bring it from 7.2 MHz to 1.8 MHz.

In order to provide an undistorted image of the bottom area, the single or double spiral display should not have uniform separation between successive 360° turns. Instead the radius of the spiral at any point should be proportional to the bottom range at that point. In the example illustrated by FIG. 12 the separation between successive spirals would be 63% greater at the center of the spiral than at the outer edge of the spiral.

Figure 18:
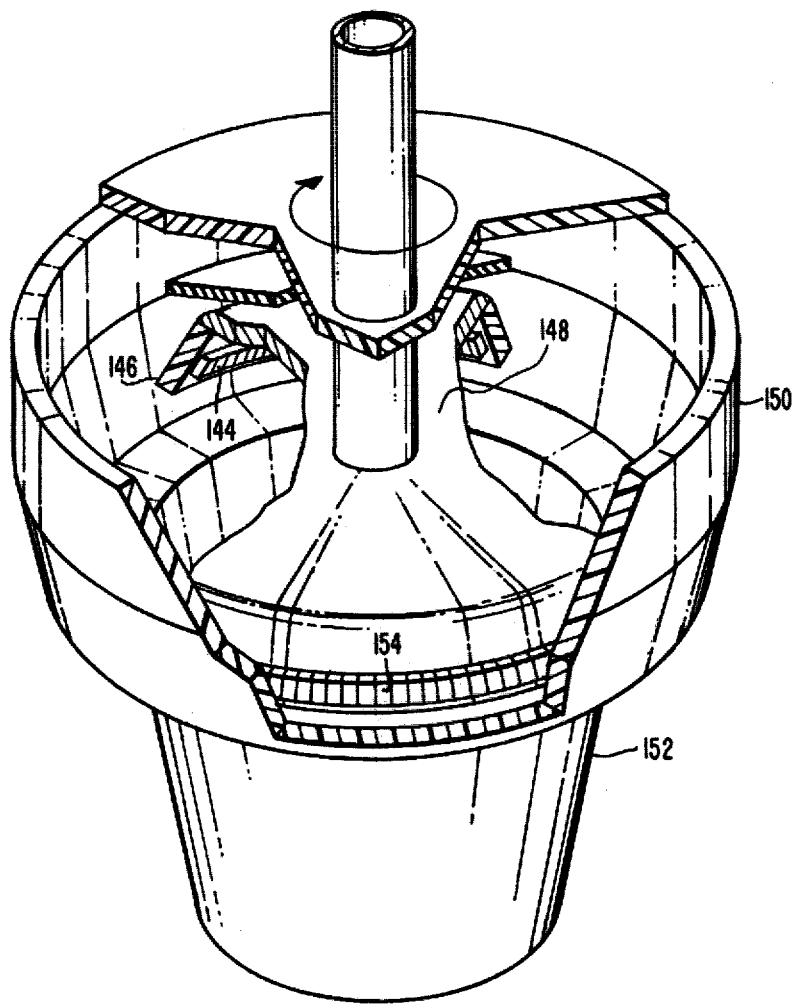
FIG. 18 is a view, with portions broken away, illustrating another type of rotation for obtaining sector coverage.

In the embodiment of FIG. 5, the transducers were stationary relative to lens portion 72 and the entire acoustic camera 70 rotated. In the embodiment of FIG. 18, the transducer active elements 144 and backing material 146 are mounted on a support 148 which is rotatable within the housing 150, such that conical lens portion 152 is stationary while the active elements are rotated to accomplish the same operation as that described with the apparatus of FIG. 5. A projector 154 may also be connected to the rotating support 148 such that the receiving array 144 covers a 72° sector while the projector covers a 126° sector.

Figure 19B:
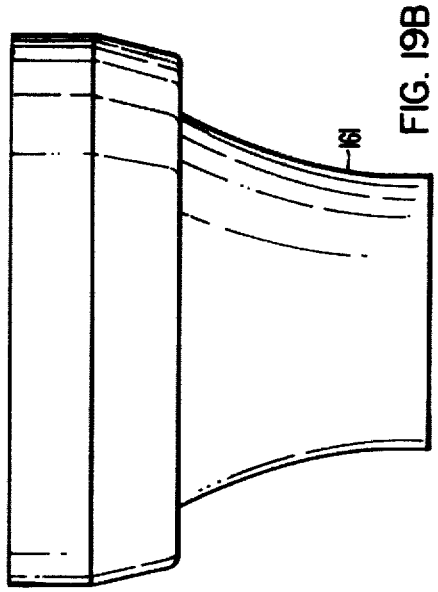
FIGS. 19A through 19D are sectional views of several other embodiments of the present invention.
Figure 19D:
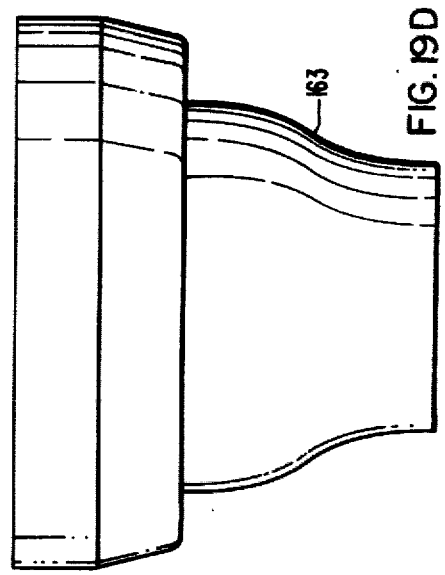
Figure 19A:
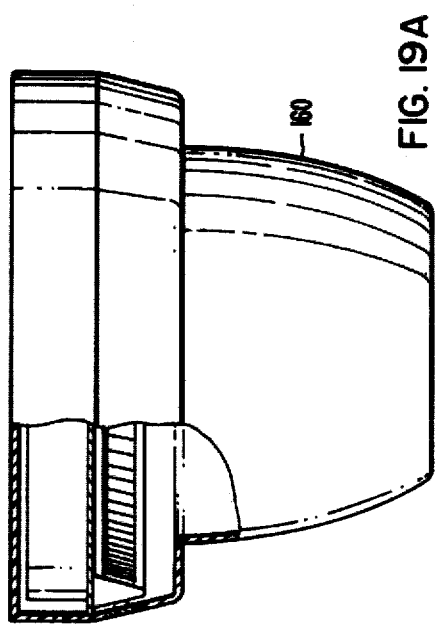
Figure 19C:
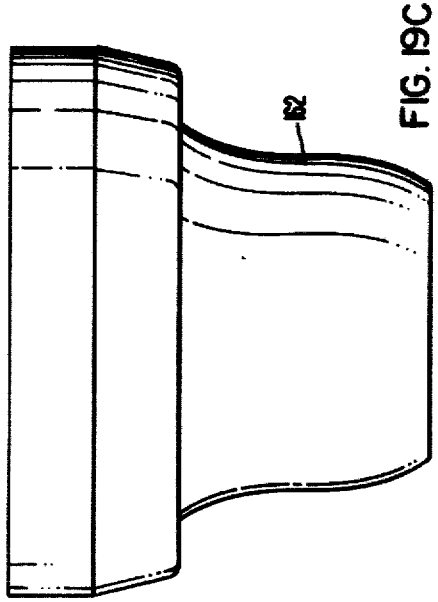

Several independent variables have been mentioned for the design of the acoustic camera. Other design modifications may be directed to the shape of the generally conical lens surface as illustrated by way of example in FIGS. 19A through 19D. In FIG. 19A lens surface 160 has a slight convexity whereas in FIG. 19B lens 161 has a slight concavity. FIGS. 19C and 19D illustrate lens 162 and 163 as respective complementary compound surfaces.

When one attempts to form beams much smaller than 0.5° with spherical or with cylindrical lens, spherical aberrations may be a problem. This is also the case with respect to the conical lens described herein. There are two ways to reduce this problem of aberration. One is to use a conical lens shell of a material that reduces the effective aperture of the lens. This requires a larger lens in order to obtain the desired aperture but the aberration is reduced. A second way of reducing the aberration problem is to use two concentric cones 170 and 172 as illustrated in FIG. 20. The inside cone 170 with a cone half angle $\phi_2$ contains a liquid 171 with a lower acoustic dielectric constant $n_4$ than the liquid 173 used in the space between the outer cone 172 and the inner cone 170.

An O-ring seal 174 can be used to prevent mixing of the two liquids. The half angle for the outer cone is $\phi_1$. The dielectric constant of the liquid 173 is designated $n_2$ and by way of example, the acoustic refraction indeces might be: $n_0 \approx 1$, $n_2 \approx 3$, and $n_4 \approx 2.5$. The index for the shells ($n_1$ and $n_3$) will generally be less than one, polyethylene having an index of about 0.6 being one example.

For any two lens liquids and radius $R_2$ there will be an optimum ratio of cone angles $\phi_1/\phi_2$. As was the case with respect to FIG. 3A, the structure includes respective receiving and transmitting transducer elements 176 and 178 with suitable backing 180 and 182. For a given diameter of lens the goal is generally to obtain the best (narrowest) focus possible without having excessively large side lobes. Because of the symmetry of the lens about a vertical axis, beam patterns for all transducer elements in the ring (or portion of a ring) will be identical.

In liquid filled lenses that are to be used over any substantial temperature range an expansion chamber may be provided for the lens fluid. Such fluids generally have a large thermal expansion coefficient.

I claim:

1. An underwater acoustic camera for imaging a target area from a minimum range to a maximum range, comprising:
   (A) a housing structure;
   (B) said housing structure including a generally conical acoustic lens portion having a central axis oriented vertically during use over said target area;
   (C) a plurality of transducer elements arranged on the circumference of a circle which lies inside of said housing structure in a plane perpendicular to said axis with the center of said circle lying on said axis;
   (D) means for sonifying said target area;
   (E) said lens portion being shaped so as to focus acoustic returns from relatively narrow radial areas on said target area onto respective ones of said transducer elements to cause corresponding output signals therefrom; and
   (F) means for processing and displaying said output signals of said transducer elements.

2. Apparatus according to claim 1 wherein:
   (A) said acoustic lens portion is a lens of solid material having a sound velocity less than that of the surrounding water medium.

3. Apparatus according to claim 1 wherein:
   (A) said acoustic lens portion is a liquid lens;

(B) said liquid having a sound velocity less than that of the surrounding water medium and contained by a relatively thin shell.

4. Apparatus according to claim 1 wherein
(A) said lens portion comprises a compound lens having a conical volume disposed concentrically within a first generally conical volume and having a different sound velocity than the outer volume.

5. Apparatus according to claim 1 wherein:
(A) the active faces of said transducer elements lie on the surface of an imaginary cone having its apex above said elements.

6. Apparatus according to claim 1 wherein:
(A) said transducer elements are arranged 360° around said axis.

7. Apparatus according to claim 1 wherein:
(A) said circle is above said conical lens portion.

8. Apparatus according to claim 1 wherein:
(A) said transducer elements are arranged in a sector less than 360° around said axis.

9. Apparatus according to claim 8 which includes:
(A) means for rotating said transducer elements to obtain imaging of 360° of said target area.

10. Apparatus according to claim 9 wherein:
(A) both said transducer elements and said acoustic lens portion rotate.

11. Apparatus according to claim 1 wherein:
(A) the surface of said acoustic lens portion has a slight convexity.

12. Apparatus according to claim 1 wherein:
(A) the surface of said acoustic lens portion has a slight concavity.

13. Apparatus according to claim 1 wherein:
(A) the surface of said acoustic lens portion is a compound surface having both a convex and concave portion.

14. Apparatus according to claim 9 wherein said means for processing and displaying include:
(A) scan converter means for storing signals provided by said plurality of transducer elements during one revolution of said transducer elements;
(B) display means; and
(C) central control means for reading out said stored signals and providing them to said display means.

15. Apparatus according to claim 14 wherein:
(A) said display means is a cathode ray tube having a scanning electron beam; and which includes
(B) means for causing said electron beam to scan in a spiral pattern.

16. Apparatus according to claim 15 wherein:
(A) said scan is 2:1 interlaced spiral scan.

17. Apparatus according to claim 1 wherein:
(A) said housing structure has an upper portion of greater diameter than the maximum diameter of said conical lens portion.

18. Apparatus according to claim 17 wherein:
(A) said transducer elements are situated within said upper portion.

19. Apparatus according to claim 1 wherein:
(A) said means for sonifying include a plurality of transducer elements arranged generally around said circle and having active faces lying on an imaginary conical surface of a cone having its apex below said circle.

20. Apparatus according to claim 14 wherein:
(A) said means for sonifying sequentially sonifys contiguous sectors of said target area;
(B) said scan converter means includes a plurality of sections each for storing signals indicative of the returns from respective ones of said sectors; and
(C) said central control means being operable to read out the contents of all of said sections during a time interval less than the time interval between successive sonifications.

* * * * *